(12) United States Patent
Kemp et al.

(10) Patent No.: US 6,364,384 B1
(45) Date of Patent: Apr. 2, 2002

(54) VEHICLE BUMPER CONCEALMENT

(75) Inventors: Ronald S Kemp, Oxford; Michael J Riegler, Fair Haven, both of MI (US)

(73) Assignee: DaimlerChrysler Corporation, Auburn Hills, MI (US)

(*) Notice: Subject to any disclaimer, the term of this patent is extended or adjusted under 35 U.S.C. 154(b) by 0 days.

(21) Appl. No.: 09/736,922

(22) Filed: Dec. 14, 2000

(51) Int. Cl.[7] .......................... B60R 19/03; B60R 19/44
(52) U.S. Cl. .................. 293/120; 293/121; 293/155
(58) Field of Search ................... 293/102, 120, 293/121, 122, 155

(56) References Cited

U.S. PATENT DOCUMENTS

| | | |
|---|---|---|
| 3,875,661 A | 4/1975 | Lidstrom et al. |
| 4,167,282 A * | 9/1979 | Matsuyama ................ 293/102 |
| 4,171,143 A * | 10/1979 | Huber et al. ................ 293/121 |
| 4,830,418 A * | 5/1989 | Gest ............................ 293/155 |
| 4,838,593 A | 6/1989 | Fleming et al. |
| 4,875,728 A | 10/1989 | Copp et al. |
| 4,929,008 A * | 5/1990 | Esfandiary .................. 293/120 |
| 4,968,087 A | 11/1990 | Goria |
| 4,974,891 A * | 12/1990 | Furuta ......................... 293/120 |
| 5,201,912 A * | 4/1993 | Terada et al. ............... 293/120 |
| 5,226,695 A | 7/1993 | Flint et al. |
| 5,290,079 A * | 3/1994 | Syamal ....................... 293/120 |
| 5,580,109 A | 12/1996 | Birka et al. |
| 5,628,536 A | 5/1997 | Fulkerson |
| 5,688,006 A * | 11/1997 | Bladow et al. ............. 293/120 |
| 5,957,512 A | 9/1999 | Inada et al. |

* cited by examiner

Primary Examiner—Stephen T. Gordon
Assistant Examiner—Greg Blankenship
(74) Attorney, Agent, or Firm—Mark P. Calcaterra

(57) ABSTRACT

The rear bumper beam of a van type vehicle can be enclosed in a sheath (or fascia) that is supported independently of the bumper beam, by a sheath support fastened to a rear end surface of the vehicle body. The sheath and sheath support have an interior clearance relative to the bumper beam, such that variations in the height of the bumper beam do not disturb the alignment of the sheath with the vehicle body. The sheath and sheath support can be used on different vehicles having different wheel base dimensions and different bumper beam heights.

10 Claims, 3 Drawing Sheets

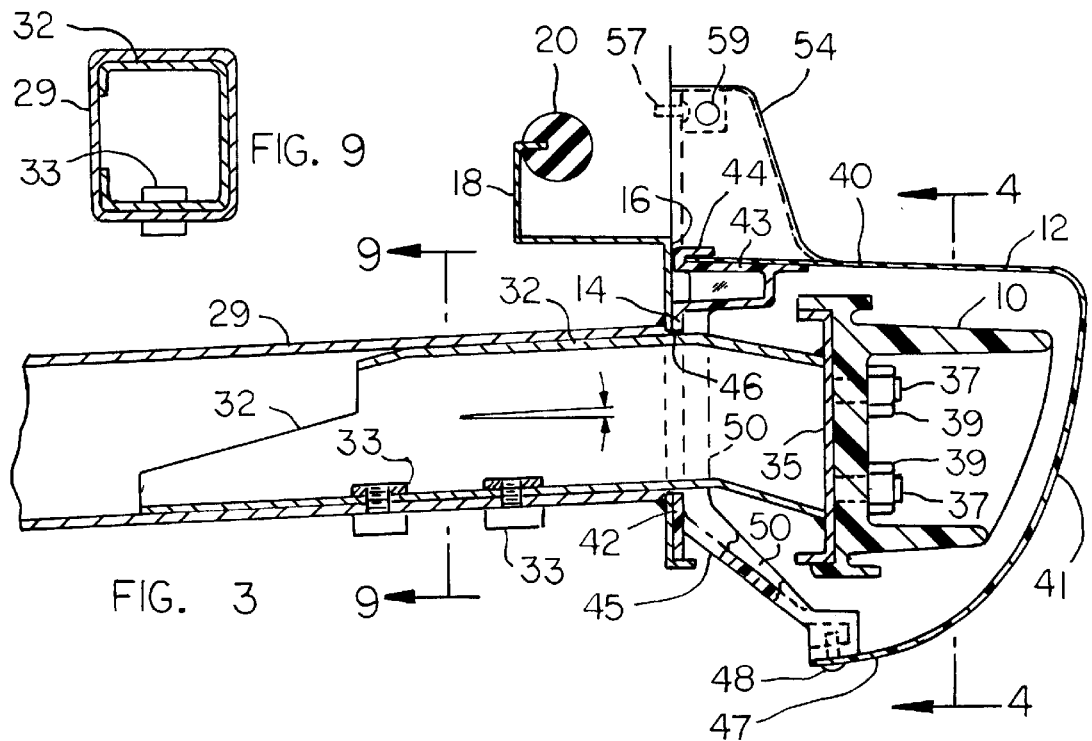
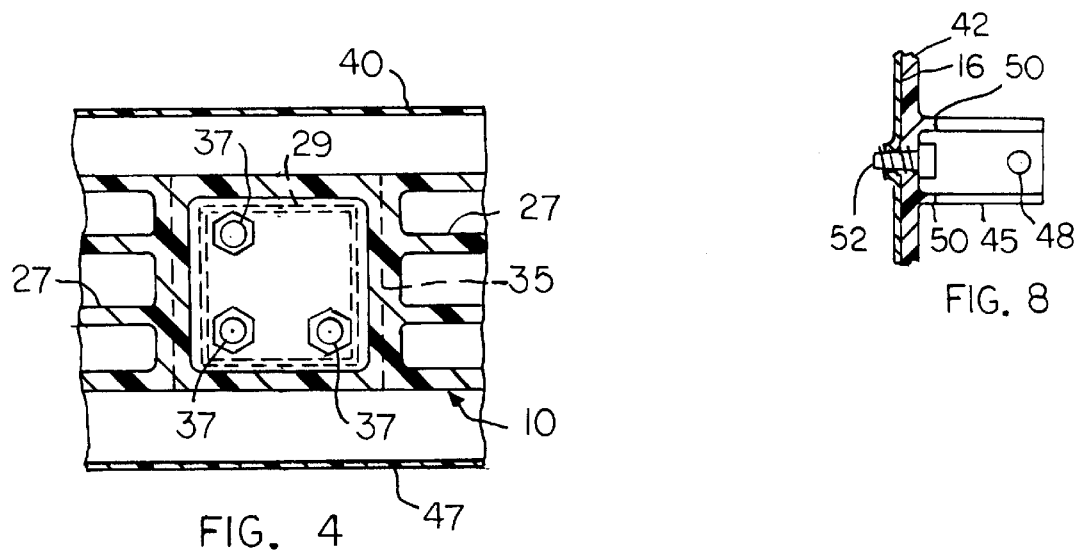

400

VEHICLE BUMPER CONCEALMENT

FIELD OF THE INVENTION

This invention relates to a vehicle bumper, and an ornamental sheath (fascia) for concealing the bumper.

BACKGROUND OF THE INVENTION

U.S. Pat. No. 5,580,109, issued to M. Birka et al on Dec. 3, 1996, shows an ornamental fascia (or sheath) for concealing a vehicle bumper beam. The sheath is secured to the vehicle bumper beam by an internal sheath support mechanism that runs along the bumper beam front surface. The sheath front edge abuts the rear end surface of the vehicle body so that the sheath conceals the bumper beam from view.

In some vehicles the rear bumper beam is supported by two parallel bars that extend forwardly from the bumper beam into longitudinal rails on the underside of the vehicle body. These rails slope upwardly in the front-to-rear direction.

Van type vehicles are sometimes built to have different wheel base dimensions, e.g. a short wheel base version and a long wheel base version. The upwardly sloped nature of the longitudinal rails causes the rear bumper beam height to vary slightly from one vehicle model to the other vehicle model. The bumper beam height for the long wheel base model will be slightly higher that the bumper beam height for the short wheel base model.

This variation in bumper beam height effectively prevents the ornamental sheath assembly of U.S. Pat. No. 5,580,109 from usage on van type vehicle models having two or more wheel base dimensions, In the sheath assembly of U.S. Pat. No. 5,580,109 the sheath (fascia) is rigidly joined to the bumper beam so that the sheath assembly would be slightly higher on the long wheel base version, and slightly lower on the short wheel base version. It is not possible for a given sheath assembly to have proper alignment with the vehicle body on both wheel base versions. Therefore, the sheath assembly of U.S. Pat. No. 5,580,109 cannot be used with the described vehicle body styles.

SUMMARY OF THE INVENTION

The present invention relates to a mechanism that can be used on a range of vehicle styles, wherein the bumper beam height varies from one vehicle body style to another style. In preferred practice of the invention the sheath (fascia) is carried on a concealed sheath support member that is fastened to the rear end surface of the vehicle body (instead of the bumper beam). The sheath and sheath support member have an interior clearance relative to the bumper beam, so that the bumper beam height can vary (from one vehicle wheel base to another wheel base) without adversely affecting the relationship between the sheath and the vehicle body. The sheath has proper alignment with the vehicle body, even though the bumper beam height is higher for the long wheel base vehicle, and lower for the short wheel base vehicle.

Specific features of the invention will be apparent from the attached drawings and description of an illustrative embodiment of the invention.

BRIEF DESCRIPTION OF THE DRAWINGS

FIG. 3 is a fragmentary transverse sectional view taken on line 3—3 in FIG. 1.

FIG. 4 is a fragmentary sectional view taken on line 4—4 in FIG. 3.

FIG. 8 is a fragmentary sectional view taken on line 8—8 in FIG. 5.

FIG. 9 is a transverse sectional view taken on line 9—9 in FIG. 3.

DESCRIPTION OF A PREFERRED EMBODIMENT OF THE INVENTION

Figure 1:
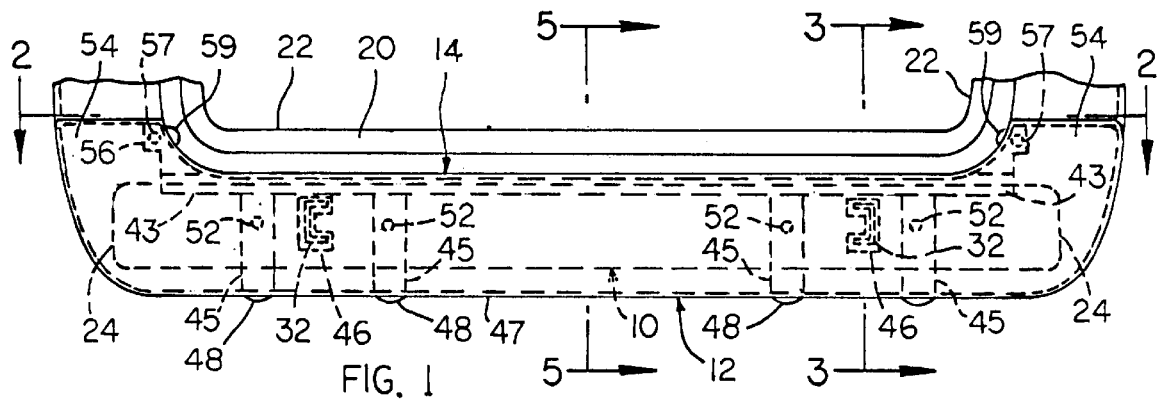
FIG. 1 is a rear end view of the bumper beam fascia (sheath) embodying the present invention.
Figure 2:
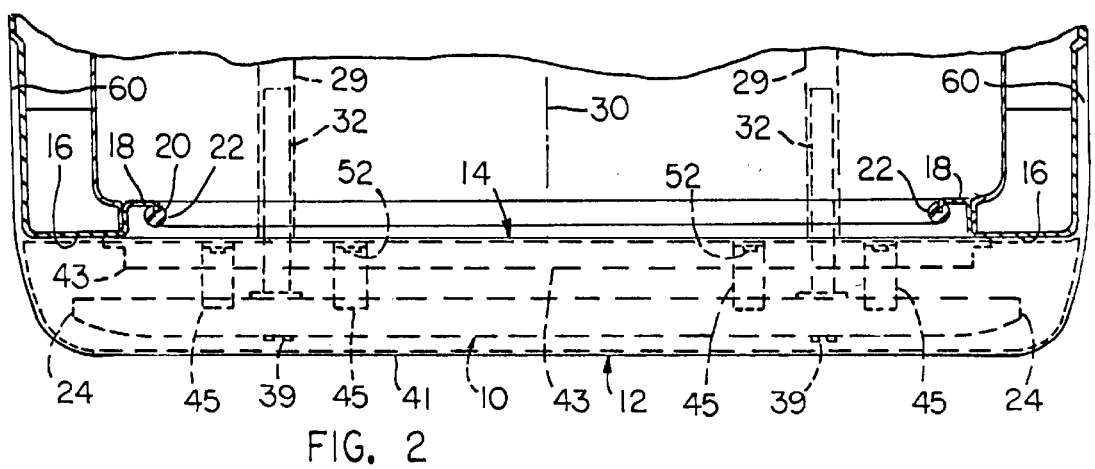
FIG. 2 is a fragmentary top plan view of the FIG. 1 sheath assembly.

Referring to FIGS. 1 through 3, there is shown a bumper beam sheath assembly constructed according to the invention. The term "sheath" as used herein, is synonomous with the term "fascia" that is sometimes used to describe an ornamental covering or enclosure for a vehicle bumper beam.

In FIGS. 1 through 3, the bumper beam (or bumper reinforcement) is referenced by numeral 10. The sheath is referenced by numeral 12, and a sheath support means is referenced by numeral 14.

The associated vehicle body has a rear end surface 16 that serves as a mounting surface for sheath support means 14. As shown in FIGS. 1 through 3, surface 16 has a recessed edge flange 18 that mounts a weatherstrip 20 defining a door opening 22. The rear door of the vehicle (not shown) is hingedly mounted at the rear edge of the vehicle roof for downward swinging movement into sealing contact with weatherstrip 20. The vehicle is a van type vehicle of conventional construction. The present invention is concerned primarily with the sheath assembly, comprised of sheath 12 and sheath support means 14.

The sheath assembly is constructed so as to have an interior clearance relative to bumper beam 10, whereby the bumper beam height can vary without affecting the relationship between the sheath assembly and the vehicle body.

The illustrated bumper beam 10 is a molded one-piece plastic member extending transversely across the rear end of the vehicle body in spaced relation to vehicle end surface 16, as shown best in FIG. 3. FIGS. 1 and 2 show the bumper beam as having ends 24 located laterally beyond the door opening 22 so as to protect the vehicle against rear end damage.

Figure 5:
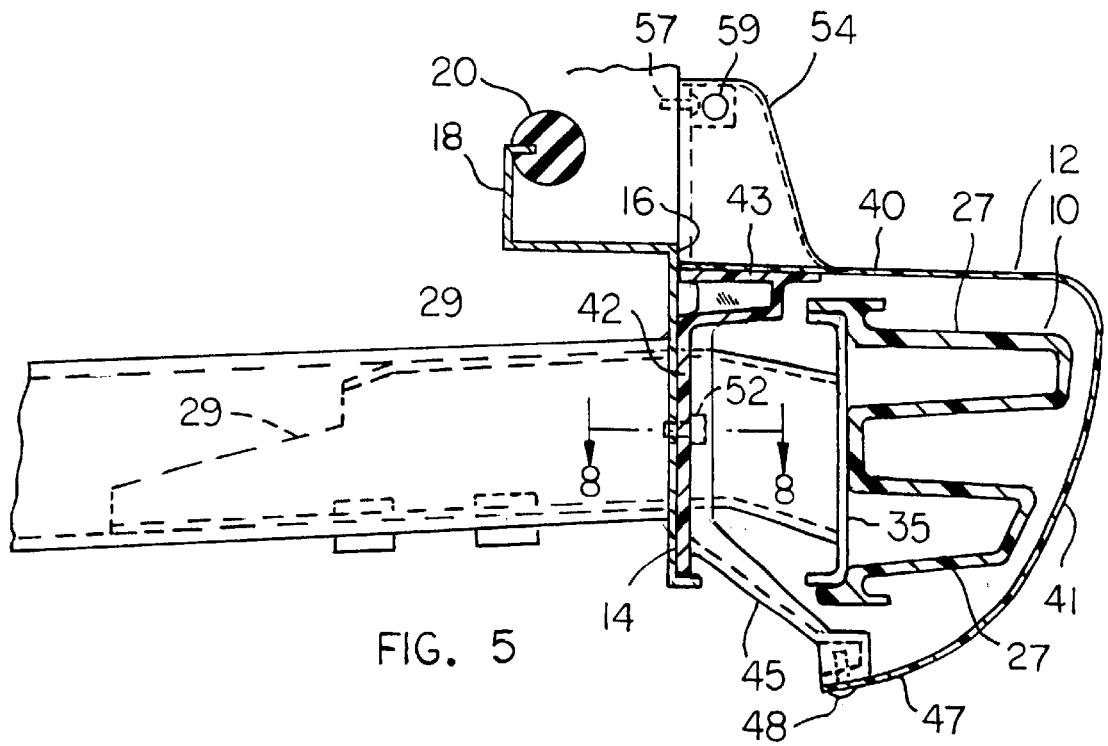
FIG. 5 us a fragmentary transverse sectional view taken on line 5—5 in FIG. 1.

As shown in FIG. 5, bumper beam 10 has a sinuous wall construction, that includes horizontal walls 27 spaced vertically apart so as to exhibit a relatively high impact resistance in the beam horizontal plane. FIG. 5 depicts the bumper beam cross section existing between the beam ends 24, except at the beam areas where the beam is mounted to the vehicle body.

FIGS. 3 and 4 show the beam cross section where the beam is attached to the vehicle body. The vehicle body has two longitudinal rails 29 extending underneath the body generally parallel to the vehicle body longitudinal axis. As shown in FIG. 2, rails 29 are equidistant from the longitudinal axis 30 of the vehicle body. In the present invention, bumper beam 10 is mounted to these rails, via two parallel bars 32. As shown in FIG. 3, a representative bar 32 extends from bumper beam 10 forwardly into an associated rail 29. Each bar is rigidly secured to the associated rail 29 by plural fasteners 33.

As shown in FIG. 9, each rail 29 has a hollow rectangular cross section. The associated bar 32 has a C cross section having a telescopic fit in the rail. Each bar 32 is rigidly fastened to bumper beam 10 by means of a rectangular face plate 35 that is welded onto the rear end of the bar. Each face plate 35 has three studs 37 extending horizontally through openings in flat wall sections of the molded beam 10. Nuts 39 are threaded onto the studs to securely mount beam 10 to face plate 35. Plate 35 has an extensive face area in contact with the bumper beam so that the beam is adequately supported in a rear end collision situation.

Molded beam 10 has a relatively good impact resistance in the beam horizontal plane, while at the same time being relatively light (to minimize the overall weight of the vehicle). As shown in FIG. 3, beam 10 has clearance with respect to sheath 12 and sheath support means 14. Accordingly, the height of beam 10 can vary without disturbing the alignment of the sheath assembly on the vehicle body.

Bumper support rails 29 slope upwardly in the front-to-rear direction, as can be seen from FIG. 3. The slope of rails 29 is a factor in the design of the sheath assembly. The vehicle can have a different wheel base, in accordance with customer preferences. With a short wheel base vehicle, the rear ends of rails 29 will be slightly lower (relative to the ground surface) as compared to the short wheel base vehicle. The height difference is due to the sloping nature of the rails.

Because of the height difference, bumper beam 10 will have a slightly higher location for a long wheel base vehicle, and a slightly lower location for a short wheel base vehicle. FIG. 3 shows the bumper beam location for a short wheel base vehicle. The upper surface of bumper beam 10 is spaced slightly below upper wall 40 of sheath 12. With a long wheel base vehicle, beam 10 will be located within the sheath so that the beam upper surface is spaced a lesser distance from upper wall 40 of the sheath. The sheath 12 and sheath support 14 can be the same for both the long wheel base vehicle and the short wheel base vehicle. Sheath 12 is sized so that the sheath and sheath support means 14 have an interior clearance relative to bumper beam 10, irrespective of the wheel base dimension.

Sheath support means 14 is a one piece molded member formed of a plastic material. The molded member includes a flat panel 42 positioned flatwise against rear end surface 16 of the vehicle body, and a horizontal platform 43 extending rearwardly from the upper edge of panel 42, to form a support surface for wall 40 of sheath 12. Platform 43 extends slightly beyond the lateral edges of door opening 22, as viewed in FIGS. 1 and 2. The platform can be of double wall construction, wherein the spaced walls are connected at spaced intervals by internal ribs, such that the platform has a desired stiffness and dimensional stability.

Panel 42 of the sheath support has two openings 46 aligned with rails 29, whereby bars 32 are enabled to pass through openings 46 into telescopic fits with rails 29. Sheath support 14 is installed on end surface 16 of the vehicle body prior to the operation of inserting bars 32 into rails 29. Bumper beam 10 is preferably fastened to the face plates 35 prior to the operation of inserting bars 32 into rails 29.

Sheath support means 14 includes four laterally spaced legs 45 that extend rearwardly and downwardly from panel 42, as shown best in FIGS. 3 and 5. The terminal ends of legs 45 are fastened to lower wall 47 of sheath 12, by fasteners 48. Each leg 45 has a channel cross section, that includes a web wall and spaced flanges 50. As shown best in FIGS. 5 and 8, flanges 50 continue upwardly from the associated leg 45 along the rear surface of panel 42, to reinforce the panel against twisting. Legs 45 are integral with the panel.

Panel 42 is fastened to the rear end surface 16 of the vehicle body by four fasteners 52 spaced along the panel. Preferably, each fastener 52 is located between flanges 50 of a leg 45, whereby the fastener locations coincide with the strongest areas of the panel.

Sheath 12 includes an upper wall 40 overlying platform 43, a rear wall 41 extending downwardly from wall 40, and a lower wall 47 extending forwardly from wall 41 underneath bumper beam 10. The front edge of platform 43 can be provided with a lip 44 at selected points along the platform length to prevent sheath 12 from pulling away from end surface 16 of the vehicle body.

End areas of sheath 12 are curved upwardly, as at 54, to form smooth joint continuations with the vehicle body. End areas 54 of the sheath are supported by two laterally spaced ears 56 that extend integrally upwardly from panel 42 of the sheath support. These ears are secured to end surface 16 of the vehicle body by fasteners 57. Flanged portions of sheath areas 54 are secured to ears 56 by fasteners 59. Fasteners 59 augment the fastening actions of fasteners 52 (FIGS. 1 and 8).

In preferred practice of the invention, sheath support 14 is a one piece molding that forms panel 42, legs 45, platform 43, and ears 56. Sheath 12 is a one piece plastic molding that is fastened to sheath support 14 by four fasteners 52 and two additional fasteners 59. Sheath 12 is continued around the rear corners of the vehicle body and along side surfaces of the body, as shown generally in FIGS. 6 and 7. The sheath includes two forwardly extending walls 60 that are flanged along their peripheral edges to reinforce the respective walls 60, and to connect such walls to brackets 62 carried by recessed portions of the vehicle body side walls.

Figure 6:
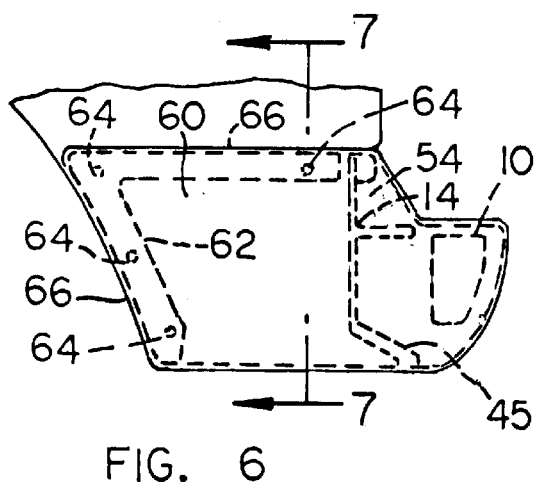
FIG. 6 is a fragmentary side elevational view of the bumper beam sheath depicted in FIG. 1.
Figure 7:
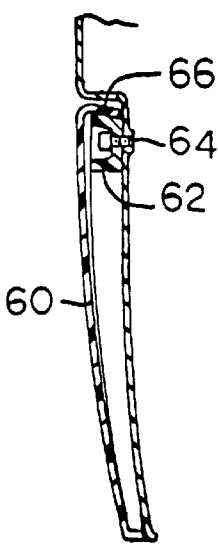
FIG. 7 is a fragmentary sectional view taken on line 7—7 in FIG. 6

As shown in FIGS. 6 and 7, a representative bracket 62 is secured to the vehicle side wall by four fasteners 64. Flanges 66 on sheath wall 60 hook around edge areas of the bracket to secure sheath wall 60 to the bracket. The securement action is achieved during initial manipulation of sheath 12 into position on the sheath support 14. After sheath 12 is in place on sheath support 14, fasteners 48 and 59 are driven home to achieve a secure fastening of the sheath to sheath support 14.

A major feature of the invention is the use of a sheath support 14 that is secured to the vehicle body end surface 16, rather than to the bumper beam. Sheath 12 is supported independently of the bumper beam, so that the sheath and sheath support have interior clearance with respect to the bumper beam. The height of the bumper beam can be varied for differently sized vehicles, without disturbing the relation between sheath 12 and the vehicle rear end surface. The same sheath and sheath support can be used for two different vehicles, i.e. a first vehicle having a relatively short wheel base, and a second vehicle having a relatively long wheel base.

What is claimed:

1. In combination, a vehicle body having a rear end surface; a body-support frame that includes two longitudinal hollow rails having rear ends terminating at said rear end surface; a bumper beam located behind said rear end surface; two parallel mounting bars extending forwardly from said bumper beam into said hollow rails; means rigidly connecting said bars to said rails, whereby said bumper beam is immovable with respect to said rails; an ornamental sheath surrounding said bumper beam so that the bumper beam is concealed from view; and a sheath support means having a plastic panel having facial contact with the rear end surface of the vehicle body, said plastic panel having spaced openings therein accommodating said parallel mounting bars; said sheath and said sheath support means having an interior clearance relative to the bumper beam, whereby the bumper beam height can vary without affecting the relationship between the ornamental sheath and the vehicle body.

2. The combination of claim 1 wherein said sheath support means further includes a horizontal platform extending rearwardly from said rear end surface of the vehicle body; said ornamental sheath including an upper horizontal wall supported on said platform, a rear wall extending downwardly from said upper wall, and a lower wall extending forwardly from said rear wall underneath said bumper beam.

3. The combination of claim 2, wherein said sheath support means comprises plural legs extending downwardly and rearwardly from said plastic panel, said legs having terminal end surfaces fastened to the lower wall of said sheath.

4. The combination of claim 3, wherein each said leg has a channel cross section that includes two spaced flanges; said flanges continuing upwardly along said plastic panel to provide reinforcements for said panel.

5. The combination of claim 4, wherein said plastic panel is secured to the rear end surface of the vehicle body by fasteners extending through said panel in locations between said spaced flanges.

6. The combination of claim 1, wherein said bumper beam is a molded plastic member having a sinuous wall construction.

7. The combination of claim 1, wherein said bumper beam is a molded plastic member having plural horizontal walls that are vertically spaced to exhibit a relatively high impact resistance in the beam horizontal plane.

8. The combination of claim 1, wherein each said mounting bar has a C cross section having a telescopic fit in the associated hollow rail; each mounting bar having a vertical plate in facial contact with said bumper beam, and plural mounting studs extending from said plate through the bumper beam.

9. The combination of claim 1, wherein each said hollow rail is sloped upwardly in a front-to-rear direction, so that the bumper beam height is inversely related to the rail length.

10. In combination a vehicle body having a rear end surface; a body-support frame that includes two longitudinal hollow rails having rear ends terminating at said rear end surface; a bumper beam located behind said rear end surface; two parallel mounting bars extending forwardly from said bumper beam into said hollow rails; means rigidly connecting said bars to said rails, whereby said bumper beam is immovable with respect to said rails; an ornamental sheath surrounding said bumper beam so that the bumper beam is concealed from view; and sheath support means comprising a plastic panel having facial contact with said rear end surface of the vehicle body, an integral horizontal platform extending rearwardly from an upper edge of said panel, two integral laterally spaced ears extending upwardly from said panel along the rear end surface of the vehicle body, and plural sheath support legs extending downwardly and rearwardly from said panel; said ornamental sheath having an upper horizontal wall supported on said platform, a rear wall extending downwardly from said upper wall, and a lower wall extending forwardly from said rear wall underneath said bumper beam; said support legs having terminal ends fastened to the sheath lower wall; said spaced ears being fastened to the rear end surface of the vehicle body; said ornamental sheath having laterally spaced flanges fastened to said ears; said sheath and said sheath support means having an interior clearance relative to the bumper beam, whereby the bumper beam height can vary without affecting the relationship between the ornamental sheath and the vehicle body.

\* \* \* \* \*